United States Patent [19]

Costanzi et al.

[11] Patent Number: 4,617,333
[45] Date of Patent: Oct. 14, 1986

[54] STABILIZED POLYOLEFINIC COMPOSITIONS AND STABILIZER COMPOUNDS SUITABLE TO THAT PURPOSE

[75] Inventors: Silvestro Costanzi, S. Giuliano; Enrico Traverso, Monza; Roberto Podestà, Albisola Sup.; Damiano Gussoni, Milan; Carlo Busetto, S. Donato, all of Italy

[73] Assignee: Enichem Sintesi, S.p.A., Palermo, Italy

[21] Appl. No.: 709,546

[22] Filed: Mar. 8, 1985

[30] Foreign Application Priority Data

Mar. 12, 1984 [IT] Italy ................ 20007 A/84

[51] Int. Cl.⁴ ............................... C08K 5/34
[52] U.S. Cl. .................................... 524/96
[58] Field of Search ............ 524/96; 544/158

[56] References Cited

U.S. PATENT DOCUMENTS

| | | | |
|---|---|---|---|
| 2,644,819 | 7/1953 | Dazzi | 524/96 |
| 2,709,756 | 3/1955 | Leistner et al. | 524/96 |
| 3,209,001 | 9/1965 | Csendes | 524/96 |
| 3,361,703 | 1/1968 | Childers | 524/96 |
| 3,558,640 | 1/1971 | Shen et al. | 544/158 |
| 4,002,594 | 1/1977 | Fetterman | 524/96 |

Primary Examiner—Morton Foelak
Assistant Examiner—Kriellion Morgan
Attorney, Agent, or Firm—Hedman, Gibson, Costigan & Hoare

[57] ABSTRACT

Stabilized polyolefinic compositions comprise a polyolefin, such as polyethylene and polypropylene and a stabilizing amount of an organic compound comprising at least one 3,3,5,5-tetramethylmorpholine or one 2,3,3,5,5-pentamethylene morpholine:

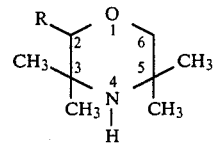

wherein R is hydrogen or the methyl group; bearing a substituent on the carbon atom in the position 2 and/or on the nitrogen atom in the position 4 of the ring.

4 Claims, No Drawings

STABILIZED POLYOLEFINIC COMPOSITIONS AND STABILIZER COMPOUNDS SUITABLE TO THAT PURPOSE

The present invention relates to stabilized polyolefinic compositions, comprising a polyolefin and a stabilizer amount of at least an organic compound, containing at least one substituted 3,3,5,5-tetramethylmorpholine or 2,3,3,5,5-pentamethyl-morpholine.

The invention relates also to said stabilizer compounds and to the process for their preparation.

It is well known that the polyolefins and in particular polyethylene and polypropylene are prone to degrade over time on exposure to the atmospheric agents, in particular due to the action by ultraviolet radiation.

Such a degradation appears as a decrease of the physical characteristics of the polymers, such as e.g. a decrease of the ultimate tensile strength and of flexibility and is accompanied by a variation of melt-flow index.

To counteract such a degradation of polyolefins it is common in the art to introduce inside them small amounts of stabilizer compounds which are usually selected among: benzotriazoles, benzophenones, nickel complexes, or stabilizer compounds of the type of fatty acid esters of N-(β-hydroxyethyl)-2,2,3,4,5,5-hexamethylpyrrolidine and esters of 2,2,5,5-tetraalkyl-4-methyl-3-methylol-pyrrolidine, the last two classes of mentioned products being disclosed in U.S. Pat. Nos. 4,325,864 and 4,346,188.

The stabilizers of the known art are not generally completely satisfactory from all the following viewpoints: stabilizing effect carried out, compatibility with the olefinic polymer wherein they are incorporated, and cheapness of their production.

The present invention is essentially based on the observation that the organic compounds containing within their molecule at least one 3,3,5,5-tetramethyl-morpholine or 2,3,3,5,5-pentamethyl-morpholine bearing a substituent on the carbon atom in the position 2 and/or on the nitrogen atom in the position 4, are highly effective stabilizers when they are incorporated inside olefinic polymers. Moreover, said stabilizer compounds are compatible with the olefinic polymers, and can be prepared in a cheap way starting from easily available raw materials, thus overcoming the drawbacks of the above mentioned known art.

Accordingly, the present invention relates to stabilized polyolefinic compositions, comprising a polyolefin and a stabilizing amount of at least one organic compound, containing at least one 3,3,5,5-tetramethyl-morpholin or 2,3,3,5,5-pentamethyl-morpholine:

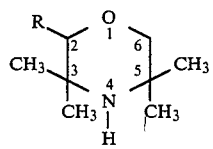

wherein R is hydrogen or a methyl group; bearing a substituent on the carbon atom in the position 2 and/or on the nitrogen atom in the position 4 of the ring. In particular, the stabilizer organic compounds according to the present invention may belong to the following classes:

Class (a)—compounds with general formula:

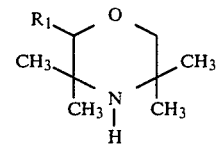

wherein:
$R_1$ is a group selected from:

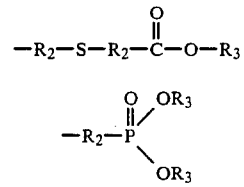

wherein:
$R_2$ is a straight or branched alkylene radical, containing from 1 to 4 carbon atoms ($C_1$–$C_4$);
$R_3$ is a straight or branched alkyl radical containing from 1 to 20 carbon atoms ($C_1$–$C_{20}$).

Class (b)—compounds with general formula

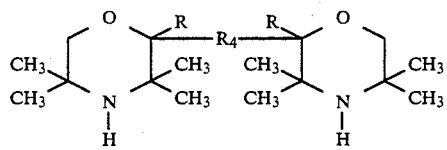

wherein:
R is hydrogen or methyl
$R_4$ is a group selected among:

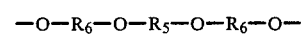

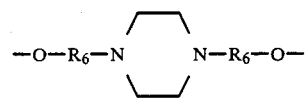

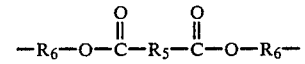

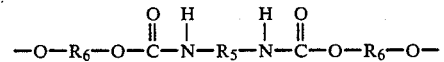

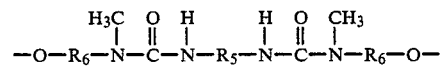

wherein:
$R_5$ is a $C_1$–$C_{10}$ straight or branched alkylene group; the phenyl group; a phenyl group bearing one or more $C_1$–$C_4$ alkyl substituent(s); a cycloalkyl group; a cycloalkyl group bearing one or more $C_1$–$C_4$ alkyl substituent(s); a di($C_1$–$C_4$)-alkylenecyclo-alkyl group;
$R_6$ is a $C_1$–$C_4$ alkylene group.

Class (c)—compounds with general formula:

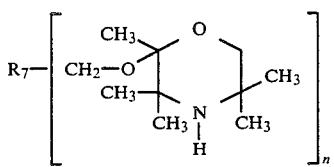

wherein:
$R_7$ is a $C_1-C_6$ aliphatic hydrocarbon residue of straight or branched chain; and n is an integer of from 1 to 4.

Class (d)—compounds deriving from the homopolymerization of

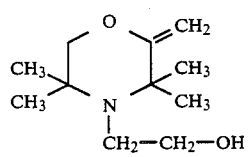

Class (e)—compounds deriving from the reaction of:

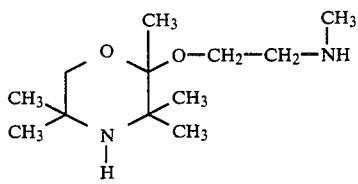

with symmetric trichlorotriazine and possibly also with a diamine such as piperazine, ethylenediamine and hexamethylenediamine.

A specific example of a compound pertaining to the class (a) is: 3,3,5,5-tetramethylmorpholine-2-methylene-thioglycolate stearyl ester.

This compound can be obtained by the transesterification reaction of 3,3,5,5-tetramethyl-2-methylenethioglycolate methyl ester with stearyl alcohol, in the presence of a transesterification catalyst.

3,3,5,5-Tetramethyl-2-methylene-thioglycolate methyl ester is in its turn obtainable by means of: the reaction of 2-amino-2-methyl-propan-1-ol with 3-chloro-3-methyl-1-butyne to yield 2-methyl-2-amino-N-(1,1-dimethyl-2-propynyl)-propan-1-ol, operating in the presence of a catalyst such as cupric chloride; followed by the cyclization reaction of 2-methyl-2-amino-N(1,1-dimethyl-2-propynyl)propan-1-ol, in the presence of a basic catalyst, such as an alkaline hydroxide, to yield 3,3,5,5-tetramethyl-2-methylene-morpholine.

Another example of compound belonging to the class (a) is:
3,3,5,5-tetramethyl-morpholine-2-methylene-diethylphosphonate, which can be obtained by means of the reaction of 3,3,5,5-tetramethyl-2-methylene-morpholine with diethylphosphite, in the presence of a radical catalyst.

Specific examples of compounds belonging to the class (b) are:
the adipic and sebacic esters of 3,3,5,5-tetramethyl-2-hydroxy-methyl-morpholine, which can be obtained by means of the reactions of 3,3,5,5-tetramethyl-hydroxymethyl-morpholine with methyl adipate and methyl sebacate under the influence of catalysts such as the alkaline alkoxides.

The compound 3,3,5,5-tetramethyl-2-hydroxymethylmorpholine can be obtained in its turn from 3,3,5,5-tetramethyl-2-methylene-morpholine by operating in the presence of a borane.

Examples of other compounds belonging to the class (b) are those which can be obtained by means of the reaction of 2,3,3,5,5-pentamethyl-2-β-hydroxyethoxymorpholine with tolylene diisocyanate, hexamethylenediisocyanate and adipoyl chloride.

The compound 2,3,3,5,5-pentamethyl-2-β-hydroxyethoxymorpholine in its turn can be obtained by reacting ethylene glycol with 3,3,5,5-tetramethyl-2-methylenemorpholine in the presence of an acid catalyst.

Other examples of compounds belonging to the class (b) are the reaction products of 3,3,5,5-tetramethyl-2-methylene-morpholine, with dihydroxylated organic compounds, such as diethoxylated hydroquinone, 1,4-dimethylolcyclohexane and p-dimethylolbenzene. These reactions are catalysed by substances of acidic character, such as sulphuric acid, p-toluenesulphonic acid and acidic ion-exchange resins. Further examples of compounds belonging to the class (b) are obtained by means of the reaction of 2,3,3,5,5-pentamethyl-2-ethoxy-(β-amino-N-methyl)-morpholine with tolylene diisocyanate and with hexamethylene diisocyanate.

The compound 2,3,3,5,5-pentamethyl-2-ethoxy-(β-amino-N-methyl)-morpholine in its turn can be prepared by means of the reaction of N-methyl-ethanolamine and of 3,3,5,5-tetramethyl-2-methylene-morpholine in the presence of acidic catalysts.

To the class (b) the product of the reaction between 3,3,5,5-tetramethyl-2-methylene-morpholine and N,N'-(di-β-hydroxy-ethyl)-piperazine is still belonging, the reaction being catalyzed by substances of acidic character, such as p-toluenesulphonic acid.

Examples of compounds belonging to the class (c) are the products of the reaction of 3,3,5,5-tetramethyl-2-methylenemorpholine with mono- or polyhydroxylated aliphatic organic compounds such as hexanediols, pentanediols, neopentyl glycol, trimethylolethane and pentaerythritol. Also these reactions are catalyzed by substances of acidic character.

To the class (d) of the compounds according to the present invention the compounds belong which derive from the homopolymerization of 3,3,5,5-tetramethyl-2-methylene-morpholine-N-[2-hydroxyethyl], in the presence of acidic catalysts, such as p-toluenesulphonic acid. These homopolymerization compounds have conveniently a molecular weight ranging from 398 to about 12,000.

The compound 3,3,5,5-tetramethyl-2-methylene-morpholine-N-[2-hydroxyethyl] can be obtained in its turn by means of the reaction of ethylene oxide with 3,3,5,5-tetramethyl-2-methylene-morpholine.

To the class (e) of the compounds according to the present invention the products belong which derive from the reaction of 2,3,3,5,5-pentamethyl-2-ethoxy-(β-amino-N-methyl)-morpholine with symmetric trichlorotriazine.

To the same class also the products belong which derive from the copolymerization of 2,3,3,5,5-pentamethyl-2-ethoxy-(β-amino-N-methyl)-morpholine with symmetric trichlorotriazine and a diamine of the type:

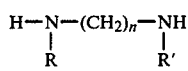

with R,R' equal to or different from each other, H, or alkyl with C≧1 and n≧2;

the

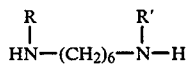

group can be conveniently substituted by one or more of the following products: piperazine, 2,5-dimethylpiperazine, hydrazine, dialkylhydrazine.

This reaction is carried out under the influence of basic catalysts and leads to copolymers having conveniently a molecular weight ranging from 400 to about 12,000.

The polymers which are stabilized, in particular against uviol radiations, by means of the stabilizer compounds according to the present invention are the olefinic polymers in general, and especially polypropylene and low-density or high-density polyethylene respectively obtained by means of the high-pressure and low-pressure processes.

The compositions according to the present invention contain the olefinic polymer and an effective amount of one or more stabilizer compound(s) described above. In particular, the effective amount of stabilizer compound is the amount conferring at least 0.003% by weight of active nitrogen to the composition, wherein by active nitrogen the nitrogen of the morpholine ring is meant.

The upper limit of the amount of stabilizer compound present in the composition is not particularly critical, it is preferable however not to exceed the amount of 0.03% by weight of active nitrogen, for economy reasons, and to the purpose of not causing undesirable variations of one or more characteristic(s) of the olefinic polymer.

In the preferred embodiment, the compositions according to the present invention contain such an amount of stabilizer compound(s) as to confer an amount of active nitrogen of from 0.005 to 0.02% by weight to the composition, with preferred values of the order of from 0.010 to 0.015% by weight.

The stabilizer compounds according to the present invention can be introduced into the olefinic polymer by any known technique allowing a uniform distribution of the stabilizer in the polymer, such as e.g. by dry-blending as a powder, or by wet-blending as a solution or a suspension. In such operations, the polymer may be used as a powder, as suspended granules, or as an emulsion.

The composition according to the present invention besides to the stabilizer compounds described above may contain further additives such as antioxidizers (phenols, phosphites, sulphides, thiodipropionic acid esters etc.), UV-light absorbers (benzophenones, benzotriazoles, salicylates, etc.), Ni-stabilizers, pigments, fillers, plasticizers, antistatic agents, fire-proofing agents, lubricants and metal deactivators.

The following experimental examples are illustrative and not limitative of the domain of the invention.

EXAMPLE 1

Preparation of 2-methyl-2-amino-N-(1,1-dimethyl-2-propynyl)-propan-1-ol

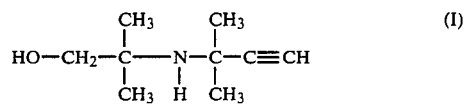

Into a 1-liter 4-neck flask provided with thermometer, dropping funnel, condenser and stirrer, 436 g (4.85 mol) of 2-amino-2-methyl-propan-1-ol and 0.5 g of cupric chloride are introduced. At a temperature of 40° C.–45° C. 250 g of 3-chloro-3-methyl-1-butyne at 90% conc. (2.1 mol) are slowly added. After 3-hours stirring, 300 ml of methyl-tert.-butylether are added and the mixture is kept stirred over two further hours.

At the end of this time period the solid is separated from the liquid by filtration and the filtrate is rectified.

The compound (I) is thus obtained in a yield of 85% relatively to 3-chloro-3-methyl-1-butyne, as a white crystalline solid, with melting point 39°–40° C. and boiling point 75°–80° C. (5 mmHg).

EXAMPLE 2

Preparation of 3,3,5,5-tetramethyl-2-methylene-morpholine

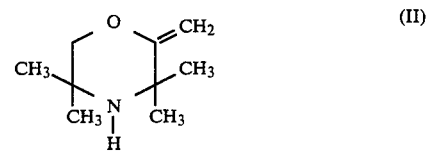

Into a 2-liter flask equipped with refluxing cooler and with a stirrer, 600 ml of toluene are introduced. Ten grams of KOH-powder and 200 g (1.29 mol) of the compound (I), obtained in Example 1, are then added.

The whole is left under stirring over two hours at refluxing temperature (120° C.).

After this time period, the reaction mixture is cooled and washed with two portions of 100 ml of water.

The mixture is then distilled, first under atmospheric pressure for separating the toluene and then under reduced pressure. The compound (II), distilling at 72°–75° C. under the pressure of 20 mmHg, is obtained with a 95% yield. The compound (II) under room conditions is a from colourless to slightly straw-coloured liquid.

EXAMPLE 3

Preparation of 3,3,5,5-tetramethylmorpholino-2-methylene-thioglycolate methylester

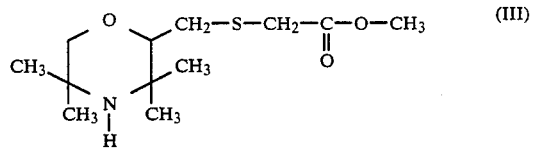

Into a reactor 31 g (0.2 mol) of the compound (II), obtained in Example 2, 25 g (0.24 mol) of methyl thioglycolate and 0.8 g of azo-bis-isobutyronitrile are loaded. The mixture is kept stirred under irradiation with a UV lamp over 4 hours, at the temperature of 20° C.

At the end of this time period the compound (II) is completely converted and the compound (III) is recovered, with a yield of 80%, by means of distillation under reduced pressure.

Said compound (III) has a boiling temperature of 135° C. under 4–5 mmHg and under room conditions it appears as a viscous liquid of pale yellow colour.

EXAMPLE 4

Preparation of 3,3,5,5-tetramethylmorpholino-2-methylene-thioglycolate stearylester

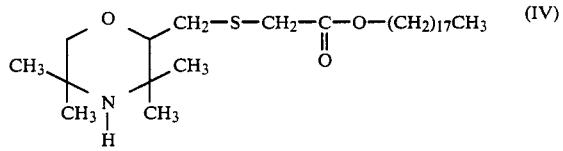

Into a flask 27 g (1.04 mol) of compound (III), obtained in Example 3, dissolved in 100 g of xylene are introduced. To this solution 27 g (0.1 mol) of stearyl alcohol and 300 mg of titanium isopropoxide are added. The so-obtained mixture is heated for 4 hours at 140°–150° C., distilling off the methanol as it forms as reaction byproduct.

At the end of the time period said, the reaction mixture is cooled and washed with two 50 ml portions of water. From the washed mixture the solvent and the lower boiling constituents are separated by stripping.

The compound (IV) is recovered as the residue from the distillation (yield 85%) and has the appearance of a glass mass of pale yellow colour.

EXAMPLE 5

Preparation of 3,3,5,5-tetramethyl-2-hydroxy-methyl-morpholine

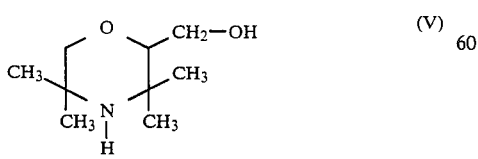

Into a flask provided with stirrer, thermometer, condenser and gas-scrubber, 15.5 g (0.1 mol) of the compound (II), obtained in Example 2 and 100 g of anhydrous tetrahydrofuran are placed. Through the scrubber and operating at 20°–30° C. borane is fed, produced in another flask by reacting NaBH$_4$ and BF$_3$-diethyl ether. After about 4 hours, through the same scrubber, a stream of nitrogen is passed, while the temperature is slowly increased from initial 20° C. to 60° C., to the purpose of removing the excess of borane.

After cooling of the reaction mass to 25° C., an aqueous-alkaline solution of hydrogen peroxide is added, and the mass is kept stirred over the next three hours. The organic layer is then separated and the aqueous layer is extracted with two further portions of tetrahydrofuran.

The organic extracts are combined, dried and evaporated. The residue from said evaporation is crystallized from petroleum ether and 8 g (0.046 mol; yield 46%) of the compound (V), as a white crystalline solid with melting point 97°–98° C. are obtained.

EXAMPLE 6

Preparation of the adipic acid ester of 3,3,5,5-tetramethyl-2-hydroxy-methyl-morpholine

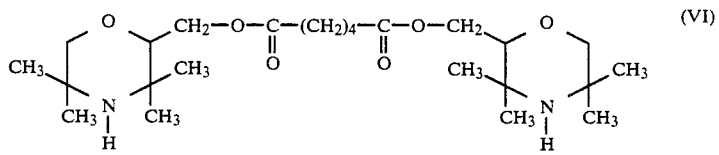

Into a glass flask, equipped with stirrer and Marcusson extractor, 17.3 g (0.1 mol) of the compound (V) obtained in example 5, 50 ml of xylene, 8.7 g (0.05 mol) of methyl adipate and 1 g of sodium methoxide are charged. The resulting mixture is heated to 140°–150° C., separating the methanol as it forms as reaction byproduct, and the course of the reaction is followed by gas chromatography.

At the end of the reaction the mass is poured into water and the organic layer is separated, dried and distilled.

As distillation residue the compound (VI) is obtained, with a yield of 90% relatively to the compound (V). The compounds (VI) is, under room conditions, a from colourless to slightly straw-coloured viscous liquid.

EXAMPLE 7

Preparation of sebacic esther of 3,3,5,5-tetramethyl-2-hydroxy-methyl-morpholine

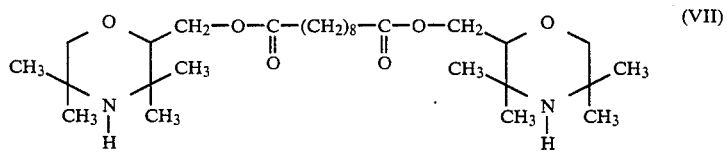

The reaction is carried out as in Example 6, by reacting the compound (V) obtained in example 5 and methyl sebacate. The compound (VII) is obtained with a yield of 80% relatively to the compound (V).

EXAMPLE 8

Preparation of 2,3,3,5,5-pentamethyl-2-β-hydroxyethoxymorpholine

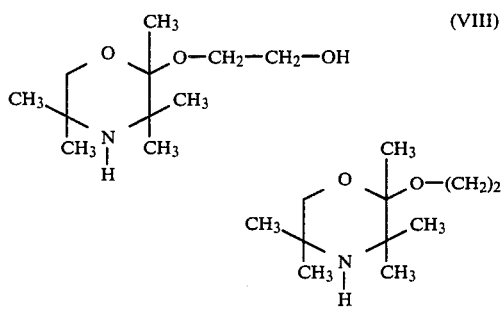

Into a flask equipped with thermometer and mechanical stirrer, 50 ml (56.5 g; 0.91 mol) of ethylene glycol and, at the temperature of 5° C., 10 ml of concentrated sulphuric acid are charged. Twenty-four grams (0.155 mol) of the compound (II), prepared in example 2 are then added, and the mass is reacted over 2 hours at 20°–30° C.

After the usual recovery processes, the compound (VIII) is obtained in a yield of about 70%, relatively to the compound (II). Said compound (VIII) is a crystalline white solid. After ricrystallization from ethyl acetate, it has a melting point of 88°–89° C.

EXAMPLE 9

Preparation of a urethanic derivative of compound (VIII), by reaction of the compound (VIII) with tolylenediisocyanate

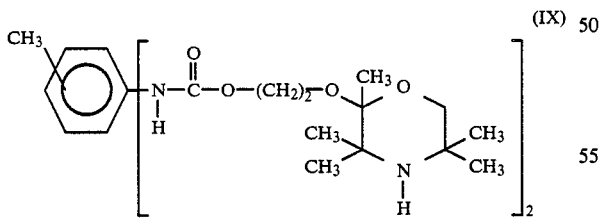

Into a glass flask equipped with stirrer, cooler, thermometer and dropping funnel, 2.2 g (0.01 mol) of the compound (VIII) prepared in Example 8, dissolved in 50 ml of toluene are loaded. The solution is heated to 50°–70° C., and a solution of 0.8 g (0.0046 mol) of tolylenediisocyanate in 30 ml of toluene is slowly added dropwise. At the end of the addition, the temperature of 60°–70° C. is maintained over the next 8 hours.

The solvent is then evaporated and the residue of said evaporation is crystallized from a 1:1 (by volume) mixture of heptane/ethyl acetate. The compound (IX) is obtained in a 92% yield relatively to the compound (VIII), such compound (IX) having a melting point of 98°–100° C.

EXAMPLE 10

Preparation of a urethanic derivative of the compound (VIII), by reaction of compound (VIII) with hexamethylenediisocyanate

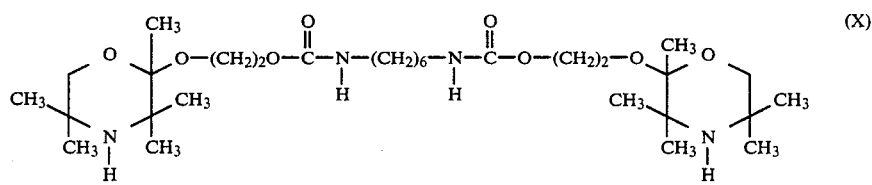

The compound (X) is obtained by operating as in preceding Example 9, from hexamethylene-diisocyanate and from the compound (VIII)

EXAMPLE 11

Preparation of the adipic acid ester of 2,3,3,5,5-pentamethyl-2-β-hydroxyethoxy-morpholine

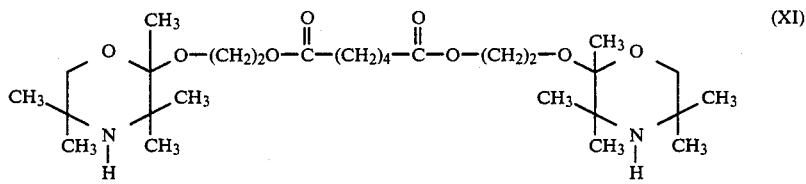

Into a 100 ml flask 50 ml of toluene, 6.6 g (0.0304 mol) of the compound (VIII) prepared in Example 8, 0.75 g of NaOH are introduced and the whole is heated at the temperature of 40°–50° C. over 2 hours. After cooling of the mass to 20° C., 2.73 g (0.015 mol) of adipoyl chloride are slowly added. At the end of the addition, the mixture is left at room temperature for about 2 hours and an aqueous solution (50 ml) of sodium bicarbonate is added, under vigorous stirring to the purpose of destroying the unreacted halogenide.

The organic phase is separated and submitted to distillation up to a temperature of 190° C., under the pressure of 5 mmHg.

The compound (XI) is thus obtained, as distillation residue, in a yield of about 80% relatively to the compound (VIII). The compound (XI) is, under room conditions, a slightly yellow-coloured viscous oil.

EXAMPLE 12

Preparation of 3,3,5,5-tetramethyl-2-methylene-morpholine-N-[2-hydroxyethyl]

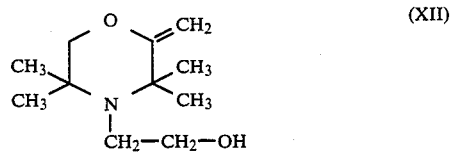

Into a 250-ml autoclave, equipped with magnetic stirrer, dipping tube and pressure gauge, 77.5 g (0.5 mol)

of the compound (II), prepared in Example 2, and 30 g of water are introduced. The reaction mass is cooled, the autoclave is purged with nitrogen and 25 g (0.57 mol) of ethylene oxide are added. The autoclave is cooled, the stirring is started, and the autoclave is heated at a temperature of about 100° C., and the course of the reaction is followed through the decrease of gauge pressure.

After about 3.5 hours, when no further pressure decrease is any longer observed, the autoclave is cooled and purged with nitrogen, the organic layer is separated from the aqueous layer and the aqueous layer is extracted with diethyl ether.

The organic phases are combined and distilled. The compound (XII) is thus obtained (yield 98%), distilling at 100°-110° C. (5 mmHg), and solidifying at room temperature (melting point 45°-48° C.).

EXAMPLE 13

Preparation of the product of polymerization of compound (XII)

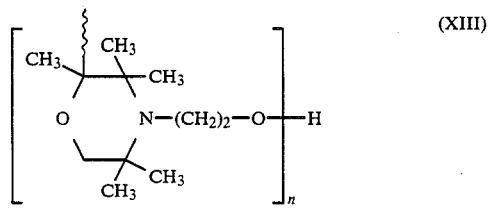

Into a 200-ml flask 50 g (0.25 mol) of compound (XII) and 0.3 g of p-toluenesulphonic acid are charged. The reaction mixture is heated to the temperature of 120°-130° C. under stirring, the reaction course being followed by chromatographic way.

At the end of the reaction to the reaction mixture toluene is added, and the whole is washed with two 50-ml portions of water. The organic layer is dried and evaporated. As the evaporation residue a yellow powder is obtained, with a softening temperature of about 115° C., corresponding to the compound (XIII) with an average molecular weight of about 2,000.

EXAMPLE 14

Preparation of acetal derivatives of the compound (II)

The reaction of addition of hydroxylated compounds to the double bond of the compound (II), prepared in Example 2, is carried out in the absence of solvents, at temperatures of the order of 100° C. and in the presence of an excess of the compound (II) over the stoichiometric amount. In the reaction an acidic catalyst is moreover used, normally p-toluenesulphonic acid (in an amount of 1 part by weight per each 50 parts by weight of the compound (II)), or sulphuric acid, or an acidic resin of the Amberlist 15 (Rohm & Haas) type.

The reaction time ranges from 4 to 18 hours as a function of the temperature and of the nature of the catalyst. At the end of the reaction, the mass is washed with a 10% aqueous solution of NaOH and the desired product is obtained in pure form by distillation or crystallization.

By operating according to the general lines as from the foregoing, the following compounds are obtained:

(XIVa) Addition product of the compound (II) with diethoxylated hydroquinone:

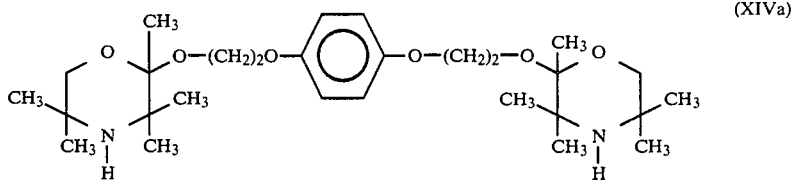

(melting point 168°-169° C.; yield 75%).

(XIVb) Addition product of the compound (II) with trans-1,4-dimethylolcyclohexane:

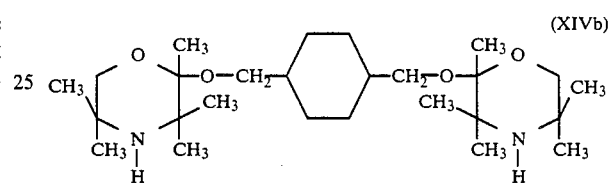

(melting point 154°-156° C.; yield 80%).

(XIVc) Addition product of the compound (II) with 1,6-hexanediol:

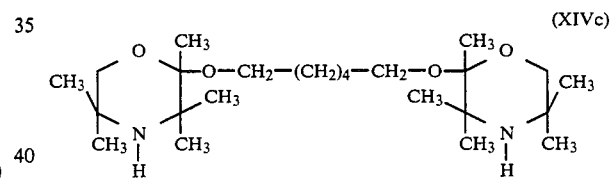

(liquid at room temperature; yield 70%).

(XIVd) Addition product of the compound (II) with neopentyl glycol:

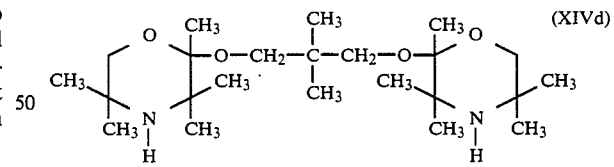

(melting point 106°-108° C.; yield 90%).

(XIVe) Addition product of the compound (II) with 1,5-pentanediol:

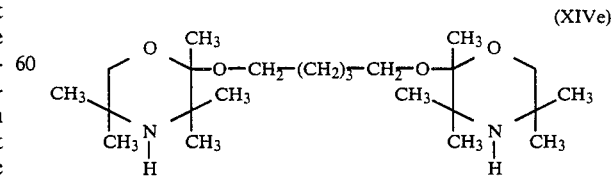

(liquid at room temperature; yield 80%).

(XIVf) Addition product of the compound (II) with trimethylolethane:

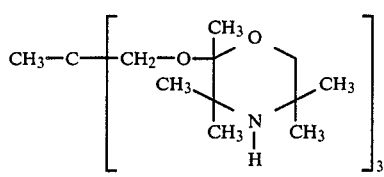
(XIVf)

(melting point 115°–116° C.; yield 90%).

(XIVg) Addition product of the compound (II) with pentaerithritol:

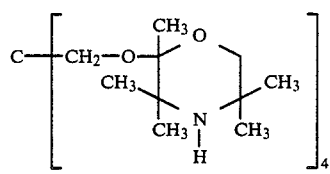
(XIVg)

(melting point 116°–118° C.; yield 70%).

(XIVh) Addition product of the compound (II) with p-dimethylolbenzene:

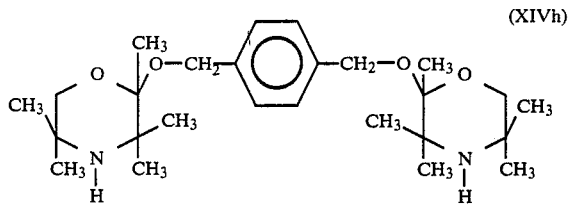
(XIVh)

(melting point: 135°–136° C.; yield 80%).

(XIVi) Addition product of the compound (II) with N,N'-(di-β-hydroxyethyl)-piperazine:

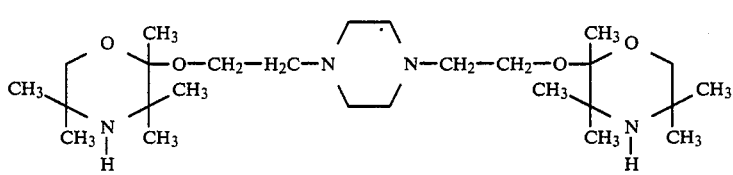
(XIVi)

EXAMPLE 15

Preparation of 2,3,3,5,5-pentamethyl-2-ethoxy-(β-amino-N-methyl)-morpholine

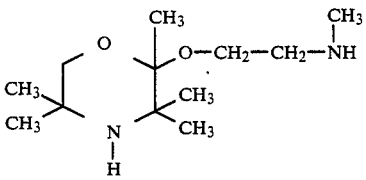
(XV)

Into a 25-ml flask, equipped with thermometer, stirrer and cooler, 15.5 g (0.1 mol) of the compound (II) prepared in Example 2; 6 g (0.08 mol) of N-methylethanolamine and 200 mg of p-toleuensulphonic acid are charged. The mixture is heated at 130° C. for 8 hours.

After cooling, to the reaction mixture diethyl ether is added, and the whole is washed with 10% aqueous solution of NaOH. The organic phase is dried and distilled. The compound (XI) which distills at 95°–97° C. (5 mmHg) is obtained with a yield of 70% relatively to N-methylethanolamine.

EXAMPLE 16

Preparation of a ureic derivative of the compound (XV), by by reaction of the compound (XI) with tolylenediisocyanate

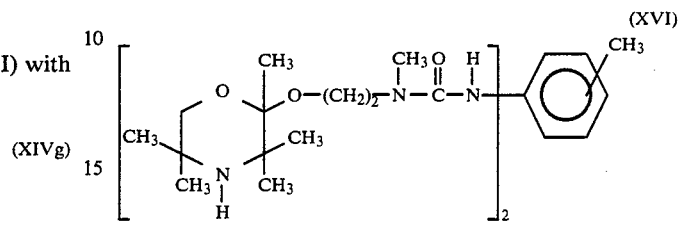
(XVI)

Into a flask 6 g (0.026 mol) of the compound (XV) prepared in Example 15, dissolved in 30 ml of toluene are charged. To the flask a solution of 2 g (0.0127 mol) of tolylene diisocyanate dissolved in 30 ml of toluene is added dropwise, operating at 30° C. After the end of the addition the reaction mass is kept at 30° C. for the next 3 hours. The toluene is then distilled off and the distillation residue is collected with cyclohexane.

The compound (XVI) crystallizes: melting point 55°–59° C., yield 92%.

EXAMPLE 17

Preparation of a ureic derivative of the compound (XV), by reaction of the compound (XV) with hexamethylene diisocyanate The compound (XVII) is obtained by operating in a similar way as of the preceding Example, from hexamethylene diisocyanate and from the compound (XV) (melting point 134°–136° C.; yields 90%).

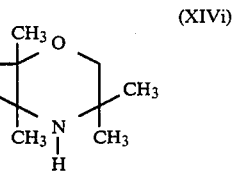

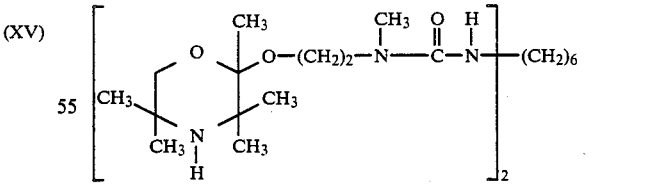
(XVII)

EXAMPLE 18

Preparation of polymer products (XVIIIa) from s-trichlorotriazine and from the compound (XV)

Into a 4-neck 250-ml flask, equipped with stirrer, refluxing cooler, thermometer and dropping funnel, 30 ml of toluene are charged, into which 18.3 g (0.1 mol) of s-trichlorotriazine are dissolved. The mixture is ice-cooled, so as to lower its temperature to 5°–6° C.

Six grams of powder-KOH are then added and a solution of 23 g (0.1 mol) of the compound (XV) in 200 ml of toluene is added dropwise, maintaining the temperature lower than 5° C.

When the addition is complete the mixture is heated to 115° C. and a solution of 8.6 g (0.1 mol) of piperazine in 30 ml of toluene is added dropwise. The reaction time is about 15 hours.

At the end of this time period 5 g of diethylamine are added and the reaction mass is maintained at boiling temperature for about 2.5 hours, so as to eliminate the possible traces of unreacted chlorine.

The reaction mass is cooled, is washed with a little of water to remove the inorganic products present and is dried on magnesium sulfate.

After having removed the solvent and the excess of diethylamine, a pale-yellow coloured solid is obtained, with softening temperature of about 115° C., corresponding to the compound (XVIIIa), with average molecular weight of about 2,000.

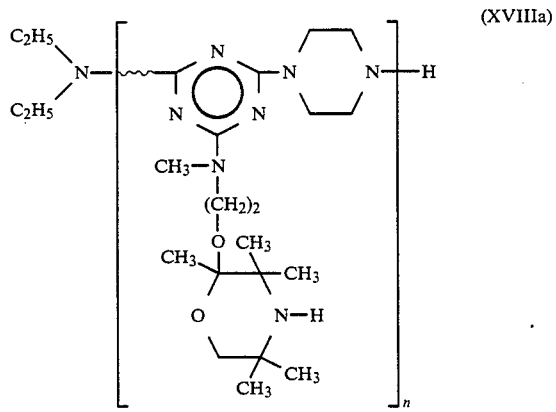

(XVIIIb) In a way similar to the polymer (XVIIIa) the polymer (XVIIIb) was prepared by replacing the piperazine with the ethylenediamine:

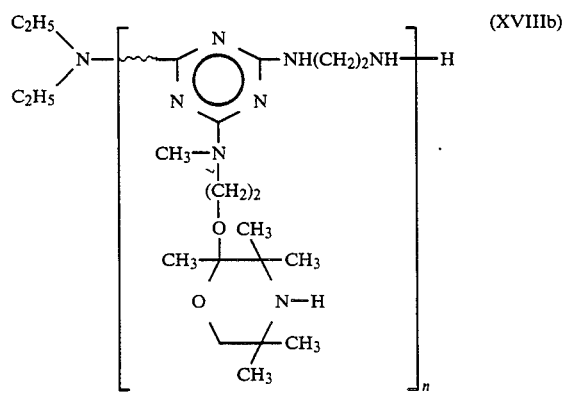

(XVIIIc) This product is analogous to the preceding ones, the piperazine having been replaced by 1,6-hexamethylenediamine:

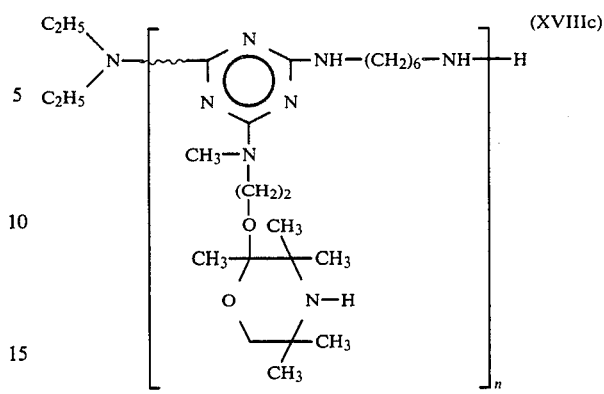

EXAMPLE 19

Preparation of 3,3,5,5-tetramethyl-morpholine-2-methylene-diethylphosphonate

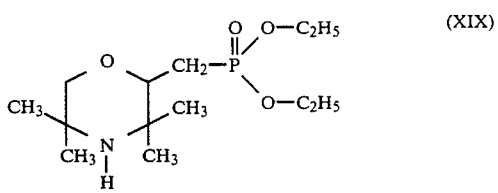

Into a 250-ml flask, equipped with stirrer, dropping funnel, thermometer and stirrer, 13.8 g (0.1 mol) of diethylphosphite are charged and are then heated to 80° C. By operating under nitrogen, a solution of 0.3 g of azo-bis-isobutyronitrile in 15.5 g (0.1 mol) of the compound (II) obtained in Example 2 is added dropwise. After the end of the addition, the reaction mixture is held at 80° C. over 3 hours and is then distilled under reduced pressure.

The compound (XIX), obtained with a yield of 50%, is separated by means of distillation at 152° C. under the pressure of 5 mmHg.

The compounds from (I) to (XIX) obtained in the preceding Examples have been identified by IR analysis, and NMR and Mass spectroscopy.

The compounds obtained in the preceding Examples are mixed with a polyolefin and their capability to prevent the degradation of the polyolefin by UV radiations is determined.

The incorporation of the compounds according to the present invention and of known additives into the polyolefin is carried out by means of usual techniques. In particular in the case of polypropylene the compounds are dissolved in benzene and the solution so obtained is mixed with polypropylene in powder form. The polypropylene does not contain any additives. The benzene is then removed by evaporation under reduced pressure. The polypropylene containing the additives and the virgin polypropylene are moulded into sheets of thickness of about 100 μm. The moulding is carried out under the following conditions: temperature 150° C., pressure 900 kg/cm$^2$, time 2 minutes. The sheet extracted from the press is quickly cooled under running water.

In the case of polyethylene, the polymer powder and the compound according to the present invention are blended in a DIOSNA blender for 30 minutes. Also in this case, the compounds according to the present invention and known additives are admixed. The known additives are added in such an amount, as to yield a content of active nitrogen of 0.015% by weight relatively to the polymer, in the case of nitrogen-containing additives, and in an amount of 0.5% by weight in the case of derivatives of benzophenone and of benzotriazole.

These amounts are those normally used for the optimum stabilization of the polyolefins. The polyethylene powders thus prepared are granulated in an extruder equipped with "reps" filter and with a screw having a compression ratio 1:4, at the speed of 30 rpm, and with the following temperature profile: 150° C., 150° C., 160° C. The granulate so obtained is then extruded again in the same extruder, equipped with sheet-producing apparatus, under the following conditions: 60 rpm, temperature profile: 160° C., 180° C., 190° C. A sheet with thickness of about 100 μm is thus obtained.

In order to evaluate the stabilizing action of the compounds according to the present invention, tests are effected on characteristics tied with the degradation of olefinic polymers. Thus, in the case of polypropylene, the oxygen absorption by the sheet submitted to UV irradation is evaluated. In particular, these tests are carried out on sheets prepared as previously described, submitted to irradiation in a photochemical reactor at the temperature of 80° C. The equipment consists of:

An irradiation reactor equipped with a high-pressure 150 Watt mercury-vapour lamp, emitting light at λ≧300 nm;

a thermostatic equilibration chamber, in order to avoid that volume changes be caused by temperature changes;

a U-shaped tube, containing mercury and provided with electrical contacts whose purpose is of actuating the motor controlling the advancing of the piston of a thermostatic graduated syringe containing oxygen.

With this equipment the movement of the piston is recorded, so as to detect the absorption of the oxygen over time. The time necessary for the oxygen absorption to begin is the induction time.

The longer the induction time, the more stable the polypropylene polymer.

For the polyethylene, the carbonyl index is evaluated at various exposure times in an ATLAS-type weather-o-meter (WOM), equipped with a 6,000 Watt xenon-lamp, emitting light at λ≧280 nm. The operating conditions of the equipment are as follows: full-light cycle, temperature on black panel 60° C., relative humidity 50%.

On the samples of polyethylene sheets, not exposed in WOM and exposed over various times, the following characteristics are measured:

ultimate elongation, according to ASTM D 882 Standard;

carbonyl index evaluated from IR spectrum and defined as:

$$I_{co} = 100 \times (\text{intensity of the 1720 cm}^{-1} \text{ band} - \text{ground intensity at 1850 cm}^{-1})/(\text{sheet thickness in } \mu m).$$

representing the percentage absorbance of a sheet of unit thickness.

The test results are shown in following Tables from 1 to 3. In particular in Table 1 the induction times are reported, for the polypropylene containing the additive compounds of the present invention, in such an amount as to yield an active nitrogen content of 0.015% by weight referred to the polymer. In Tables 2 and 3 the exposure times are reported, which yield a carbonyl index of 0.05 and cause a reduction of 50% of initial ultimate elongation for polyethylene containing the compounds according to the present invention, added in such an amount as to yield an active nitrogen content of 0.014% by weight relatively to the polymer.

In the comparison samples Tinuvin 770, or Chimasorb 944 has been added, in such an amount as to confer to the polymer an equal active nitrogen content, or a 0.5% by weight amount of Cyasorb.

TABLE 1

| Polypropylene Induction Times | |
|---|---|
| Additive | Induction Time (minutes) |
| No additives | 480 |
| Chimasorb 944 | 5,000 |
| Tinuvin 770 | 7,000 |
| Cyasorb UV 531 | 1,500 |
| Cyasorb UV 541 | 1,300 |
| Compound (IV) | 6,000 |
| Compound (VI) | 8,000 |
| Compound (VII) | 10,000 |
| Compound (IX) | 5,500 |
| Compound (XIII) | 9,000 |
| Compound (XIVa) | 9,500 |
| Compound (XIVb) | 18,000 |
| Compound (XIV) | 15,000 |
| Compound (XIVd) | 11,000 |
| Compound (XIVf) | 10,000 |
| Compound (XIVg) | 9,000 |
| Compound (XVI) | 6,000 |
| Compound (XVIIIa) | 14,000 |
| Compound (XVIIIb) | 10,000 |
| Compound (XVIIIc) | 11,000 |

TABLE 2

| Exposure times (hours) in WOM necessary to reach a carbonyl index of 0.05 in (low-density) polyethylene | |
|---|---|
| Additive | Exposure Time (hours) |
| No additives | 50 |
| Tinuvin 770 | 1,300 |
| Chimasorb 944 | >1,500 |
| Cyasorb 531 | 500 |
| Compound (IV) | 900 |
| Compound (VI) | 1,400 |
| Compound (VII) | 1,000 |
| Compound (IX) | 800 |
| Compound (XIII) | 1,300 |
| Compound (XIVa) | 1,300 |
| Compound (XIVb) | >1,500 |
| Compound (XIVc) | 1,500 |
| Compound (XIVd) | 1,200 |
| Compound (XIVf) | 1,000 |
| Compound (XIVg) | 1,000 |
| Compound (XVI) | 700 |
| Compound (XVIIIa) | >1,500 |
| Compound (XVIIIb) | >1,500 |
| Compound (XVIIIc) | 1,500 |

TABLE 3

| Exposure times (hours) in WOM necessary to lower by 50% the initial ultimate elongation of (low-density) polyethylene | |
|---|---|
| Additive | Exposure times (hours) |
| No additives | 250 |
| Tinuvin 770 | 1,100 |
| Chimasorb 944 | >1,500 |
| Cyasorb UV 531 | 600 |
| Compound (IV) | 800 |
| Compound (VI) | 1,200 |
| Compound (VII) | 1,100 |
| Compound (IX) | 800 |

TABLE 3-continued

Exposure times (hours) in WOM necessary to lower by 50% the initial ultimate elongation of (low-density) polyethylene

| Additive | Exposure times (hours) |
| --- | --- |
| Compound (XIII) | 1,300 |
| Compound (XIVa) | 1,200 |
| Compound (XIVb) | >1,500 |
| Compound (XIVc) | 1,200 |
| Compound (XIVd) | 1,100 |
| Compound (XIVf) | 1,000 |
| Compound (XIVg) | 1,000 |
| Compound (XVI) | 650 |
| Compound (XVIIIa) | >1,500 |
| Compound (XVIIIb) | >1,500 |
| Compound (XVIIIc) | >1,500 |

The commercial additives, used for the comparison tests, are:

Chimasorb 944: polymer derivative of tetramethylpiperidinium;
Tinuvin 770; tetramethylpiperidinol (bis)sebacate;
Cyasorb UV 531: derivative of benzophenone;
Cyasorb UV 5411: benzotriazole derivative.

We claim:

1. A stabilized polyolefinic composition consisting essentially of a polyolefin and a stabilizing amount of 3,3,5,5-tetramethyl-morpholine-2-methylene-thioglycolate stearyl ester.

2. A composition as defined in claim 1 wherein the polyolefin is polyethylene.

3. A composition as defined in claim 1 wherein the polyolefin is polypropylene.

4. A composition as defined in claim 1 wherein the composition contains from 0.03%–0.003% by weight of the stabilizer.

* * * * *